(12) United States Patent
Li et al.

(10) Patent No.: US 8,087,635 B2
(45) Date of Patent: Jan. 3, 2012

(54) PNEUMATIC PINCH VALVE

(75) Inventors: Lechang Li, Nanshan (CN); Yan Yan, Nanshan (CN)

(73) Assignee: Shenzhen Mindray Bio-Medical Electronics Co., Ltd., Hi-Tech Industrial Park, Nanshan, Shenzhen (CN)

( * ) Notice: Subject to any disclaimer, the term of this patent is extended or adjusted under 35 U.S.C. 154(b) by 718 days.

(21) Appl. No.: 11/563,795

(22) Filed: Nov. 28, 2006

(65) Prior Publication Data
US 2007/0170382 A1    Jul. 26, 2007

(30) Foreign Application Priority Data
Jan. 20, 2006 (CN) .................... 2006 2 0054312 U

(51) Int. Cl.
*F16K 7/04* (2006.01)
(52) U.S. Cl. ............................. 251/7; 251/5; 251/285
(58) Field of Classification Search ................. 251/5, 7, 251/4, 6, 8, 9, 10, 284, 285, 62, 63, 63.4, 251/63.5, 63.6
See application file for complete search history.

(56) References Cited

U.S. PATENT DOCUMENTS

| | | | | |
|---|---|---|---|---|
| 2,908,476 A * | 10/1959 | Hidding | ............................. | 251/8 |
| 4,081,170 A * | 3/1978 | Doss, Jr. | ............................. | 251/5 |
| 4,230,151 A * | 10/1980 | Jonsson | ........................ | 137/595 |
| 4,259,985 A * | 4/1981 | Bergmann | ........................ | 251/7 |
| 4,339,897 A * | 7/1982 | Thompson et al. | ................ | 251/5 |
| 4,492,575 A * | 1/1985 | Mabille | ............................. | 433/88 |
| 4,635,897 A * | 1/1987 | Gallant | ............................. | 251/5 |
| 4,899,783 A * | 2/1990 | Yusko et al. | ................... | 137/556 |
| 6,386,505 B2* | 5/2002 | Schob | ............................... | 251/7 |
| 6,695,278 B2* | 2/2004 | Ellis | ................................. | 251/5 |

FOREIGN PATENT DOCUMENTS

| | | |
|---|---|---|
| CN | 2262149 Y | 9/1997 |
| CN | 2373795 Y | 4/2000 |
| CN | 2442054 Y | 8/2001 |
| CN | 2727521 Y | 9/2005 |
| JP | 9-280006 | 10/1997 |
| JP | 2003-067069 | 8/2008 |

OTHER PUBLICATIONS

Definition of the term "Fixedly" from Merriam-Webster Dictionary, 2003.

(Continued)

*Primary Examiner* — John Fristoe, Jr.
*Assistant Examiner* — Andrew J Rost
(74) *Attorney, Agent, or Firm* — Vista IP Law Group, LLP

(57) ABSTRACT

A pneumatic pinch valve assembly having a lever, a piston supporting a pressing piece, and a fluid tube receiving space formed between the lever and the pressing piece for receiving fluid tubes is disclosed. Air is introduced into a cavity to actuate the piston in order to pinch a fluid tube between the lever and the pressing piece to intercept a fluid flow through the tube. A pinching action control feature is located between the piston and the pressing piece and is used to protect the fluid tube by limiting one or more amounts of compression of the fluid tube during operation. The amount of compression of the fluid tube is able to be adjusted so that the fluid tube is not easily deteriorated during long-time operation.

18 Claims, 4 Drawing Sheets

OTHER PUBLICATIONS

Definition of the term "Fixed" from Merriam-Webster Dictionary, 2003.
Definition of the term "On" from Merriam-Webster Dictionary, 2003.
SIPO Search Report for corresponding Chinese application, 4pages, dated Sep. 20, 2006.
English translation of abstract for Chineses Patent Application No. 2442054Y, dated Aug. 8, 2001.
English translation of abstract for Japanese Patent Application No. 9-280006, dated Oct. 28, 1997.
English translation of abstract for Japanese Patent Application No. 2003-067069, dated Aug. 14, 2008.
English translation of abstract for Chinese Patent Application No. 2727521Y, dated Sep. 21, 2005.
English translation of abstract for Chinese Patent Application No. 2262149Y, dated Sep. 10, 1997.
English translation of abstract for Chinese Patent Application No. 2373795Y, dated Apr. 12, 2000.

* cited by examiner

PNEUMATIC PINCH VALVE

CROSS-REFERENCE TO RELATED APPLICATIONS

This Application claims the benefit of the Chinese Application with Application No. 200620054312.1 dated Jan. 20, 2006 and entitled "Pneumatic Pinch Valve".

FIELD OF THE INVENTION

The present invention relates to a technical field of analysis on blood cells, and more particularly, relates to a valve for controlling the flow of fluid in a fluid tube so that the fluid flow is prevented (referred as "interception" hereinafter) or the fluid can flow through the tube (referred as "release" hereinafter).

BACKGROUND OF THE INVENTION

In the current Hematology Analyzer, the control of flow passage is relatively complex due to a number of tubes, large flow of fluid and high requirement for clearness. In addition, since the fluid in the flow passage has strong corrosiveness, leakage of the fluid is not permitted. In order to meet these requirements, a solenoid valve and a solenoid pinch valve are generally used to intercept and release the fluid in the flow passage.

For the solenoid valve, the fluid directly contacts with a valve cavity and a valve port of the solenoid valve during passing though the solenoid valve. Due to the construction of the solenoid valve, it is hard to prevent the residual contamination resulted from the dead region inside the solenoid valve which can not be cleaned during cleaning the solenoid valve. Moreover, the pressure loss is relatively large when the fluid flows through the solenoid valve. Therefore, such a solenoid valve is only adapted to such a case that the clearness is not required, corrosiveness of fluid is not strong and the fluid flow is not large.

For the solenoid pinch valve, as shown in FIGS. 1 and 2, a distance between a pressing piece 4 and a lever 5 is adjusted by controlling the movement of the pressing piece 4, so as to selectively pinch or release a relatively soft fluid tube 1 therebetween. When the fluid tube 1 is pinched and thus the opposite inner walls of the fluid tube 1 contact with each other in a closed state (i.e in a contacting-closed state), the fluid in the fluid tube 1 is intercepted; when the fluid tube 1 is released, the fluid is allowed to flow through the fluid tube 1. As a result, the interception and the release of the fluid in the fluid tube 1 are achieved. The above control is characterized in that the interception and release of the fluid is realized along a tube, and the fluid does not directly contact the solenoid pinch valve which only provides a pinching force from the outside of the fluid tube. Therefore, the residual contaminant, corrosion and leakage in the solenoid pinch valve will be completely avoided, the pressure loss does not exist, and the flow of fluid through the fluid tube is not affected at all. However, the above control has the following defects: heavy defect will be presented in the case of long-time interception and short-time release. If the normal-opening type of solenoid pinch valve is used, the solenoid pinch valve will operate with electricity for long time during the interception of the fluid, so that the amount of the generated heat is large and the durability of the solenoid pinch valve will be affected. If a normal-closing type of solenoid pinch valve is used, there is no problem during operation of the solenoid pinch valve, but when the solenoid pinch valve is not in the operating state, the fluid tube is always in the pinched state, which might result in fatigue break of the fluid tube and the adhesion of the inner wall thereof the fluid tube and. For assuring enough pinching force, the solenoid pinch valve is relatively bulky; however, since the heat productivity of bulky solenoid pinch valve is relatively high, the heat dissipation should be considered in the case that the valve operates for a long time and in the case that multiple solenoid pinch valves operate at the same time. In addition, the optimal pressed state can not be set according to different materials and different wall thicknesses of the fluid tubes. Noise is large during operation of the solenoid pinch valve and the manufacturing cost of the solenoid pinch valve is high.

SUMMARY OF THE INVENTION

The object of the present invention is to provide a pneumatic pinch valve which has a simple construction and is capable of preventing the earlier fatigue or breakage of the fluid tubes during the long-time operation.

In order to achieve the object of the present invention, according to a technical solution of the present invention, a pneumatic pinch valve is provided, comprising: a lever and a pressing piece, a fluid tube receiving space being formed between the lever and the pressing piece, wherein the pneumatic pinch valve further comprises a main body providing a cavity therein, and the lever being installed on the main body; a piston provided in the cavity of the main body, the piston engaging with an inner wall of the cavity of the main body so as to divide the cavity into a first cavity and a second cavity, the pressing piece being positioned in the second cavity and supported on the piston; an air inlet port provided at the first cavity, wherein air introduced into the first cavity via the air inlet port moves the piston toward the fluid tube receiving space so as to press the fluid tube through an engagement of the pressing piece on the piston with the lever, and thus intercept the fluid in the fluid tube; and an air discharge mechanism provided at the piston, by which the piston pushes the air introduced into the first cavity, and then discharges the air into outside, so that the pressing piece releases the fluid tube to allow the intercepted fluid to flow through the fluid tube.

In a preferred embodiment of the present invention, the main body may comprise a cylinder body in which the cavity is provided and a gate element integrally secured to the cylinder body; an opening communicated with the fluid tube receiving space is provided at a side of the gate element for installing the fluid tube; the lever is provided at the gate element.

In another preferred embodiment of the present invention, the air discharge mechanism may be a resilient element which is received in the second cavity of the main body and arranged around an outer wall of the piston, and two ends of the resilient element abut against an end of the second cavity and an end of the piston respectively.

In a further preferred embodiment of the present invention, the air discharge mechanism may be an air intaking mechanism which is communicated with the second cavity, and an air introduced into the second cavity via the air intaking mechanism pushes the piston so as to discharge the air in the first cavity.

Furthermore, an adjusting gasket may be provided between the piston and the pressing piece so as to adjust a size of the fluid tube receiving space between the pressing piece and the lever.

In addition, the lever is preferably in a shape of cylinder.

Moreover, a sealing ring may be provided between an outer wall of the piston and the inner wall of the cavity.

In comparison with the prior art, the pneumatic pinch valve of the present invention has the following advantages:

1) Since the pneumatic pinch valve is communicated with the air source via the air inlet port and controls the interception and release of fluid in the tube in a pneumatic manner, the construction of the pneumatic pinch valve is simple. Moreover, since the pressure of the air source can be adjusted, i.e. adjusting the pinching force applied to the fluid tube, the fluid tube is not easily deteriorated during long-time operation.

2) Since the adjusting gasket with different thickness can be used to adjust the distance between the pressing piece and the lever, the fluid tube may operate all the way under the optimal pressurized amount, which not only prevents the fluid in the fluid tube from leaking under the maximum pressure, but also makes the fluid tube have maximum durability.

BRIEF DESCRIPTION OF DRAWINGS

The above objects, aspects, features and advantages will be apparent from the following description in combination with the drawings, in which.

DETAILED DESCRIPTION OF THE PREFERRED EMBODIMENTS

Figure 1:
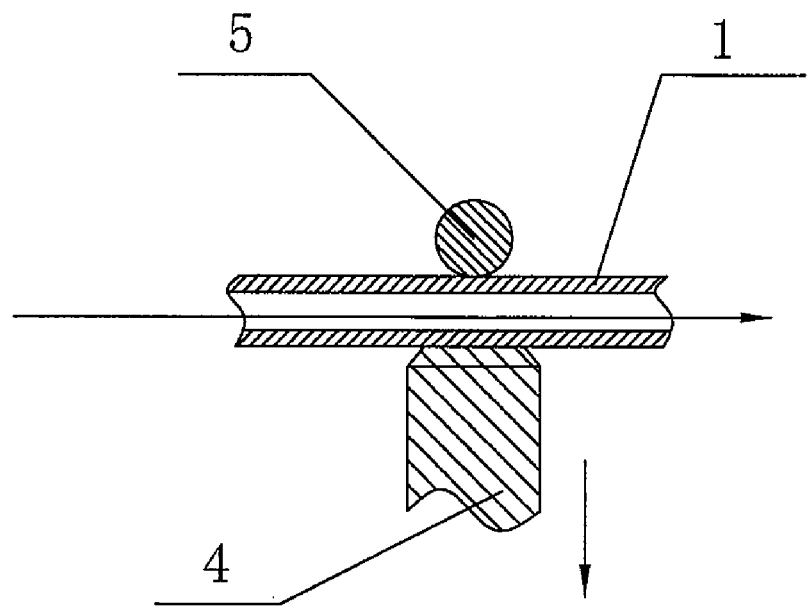
FIGS. 1 and 2 illustrate the operation process of a solenoid pinch valve in the prior art in a releasing state and an intercepting state respectively.
Figure 2:
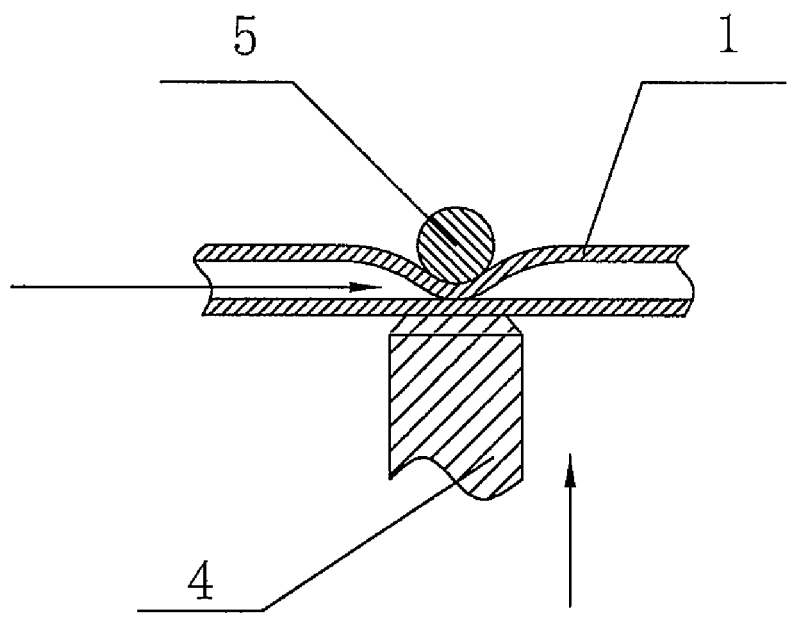
Figure 3:
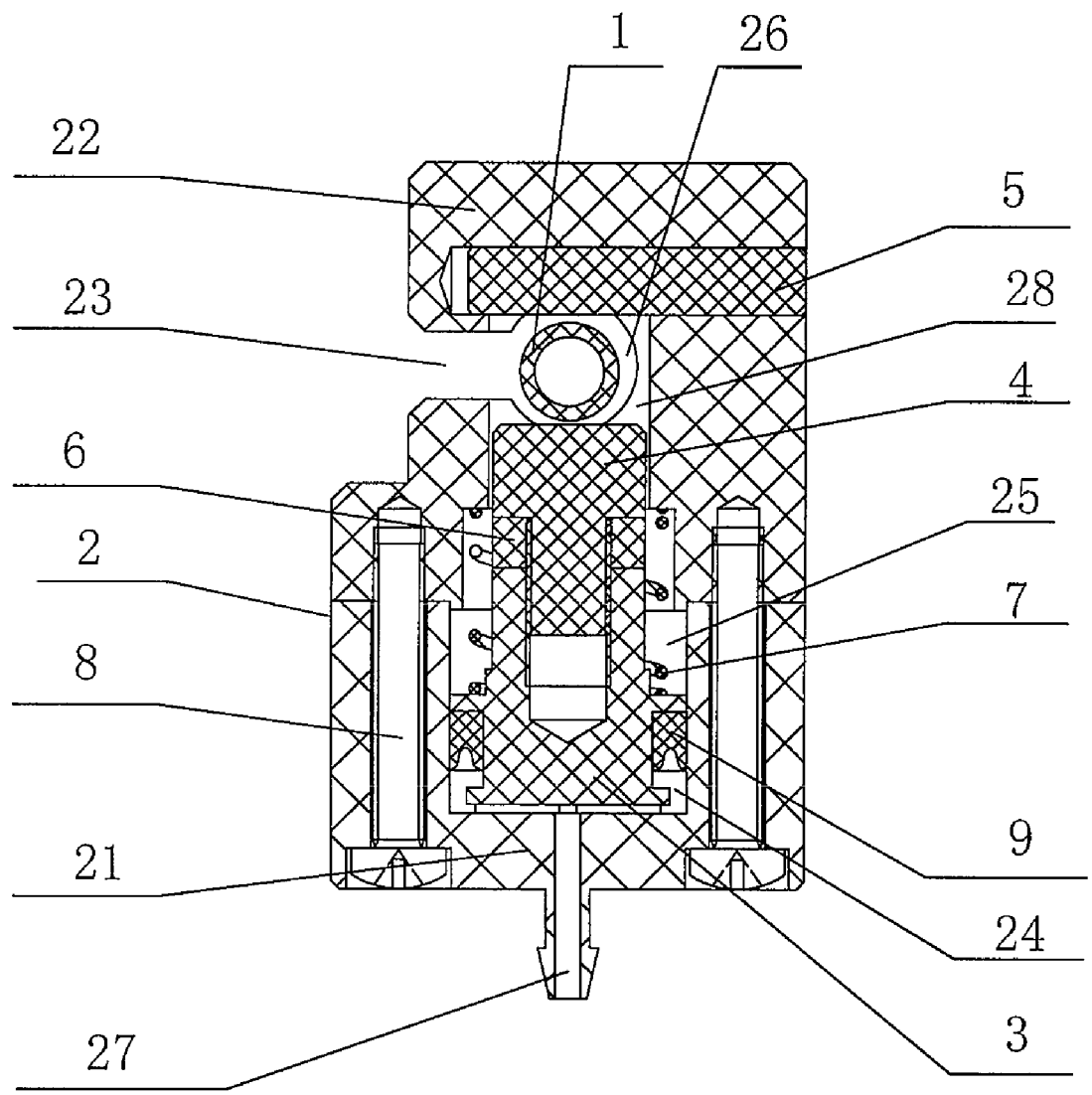
FIG. 3 illustrates a cross-sectional view of main part of a pneumatic pinch valve according to the present invention.
Figure 5:
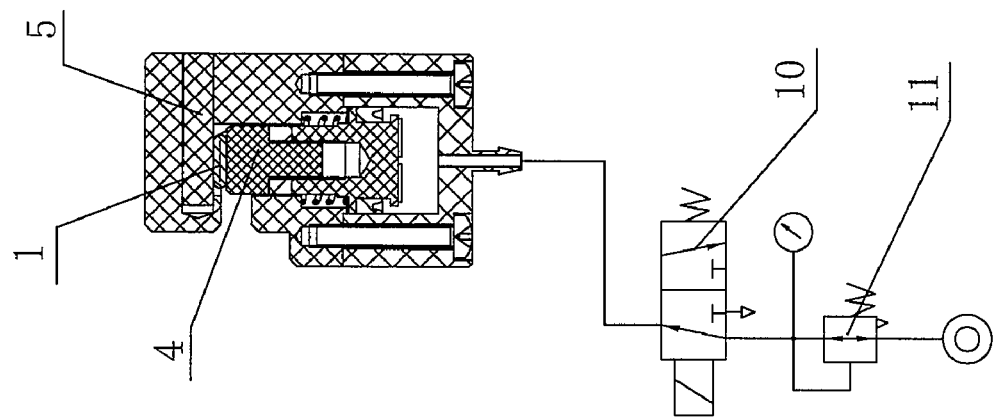
FIGS. 4 and 5 illustrate operation process of the pneumatic pinch valve respectively in the releasing state and the intercepting state according to a first embodiment of the present invention.
Figure 4:
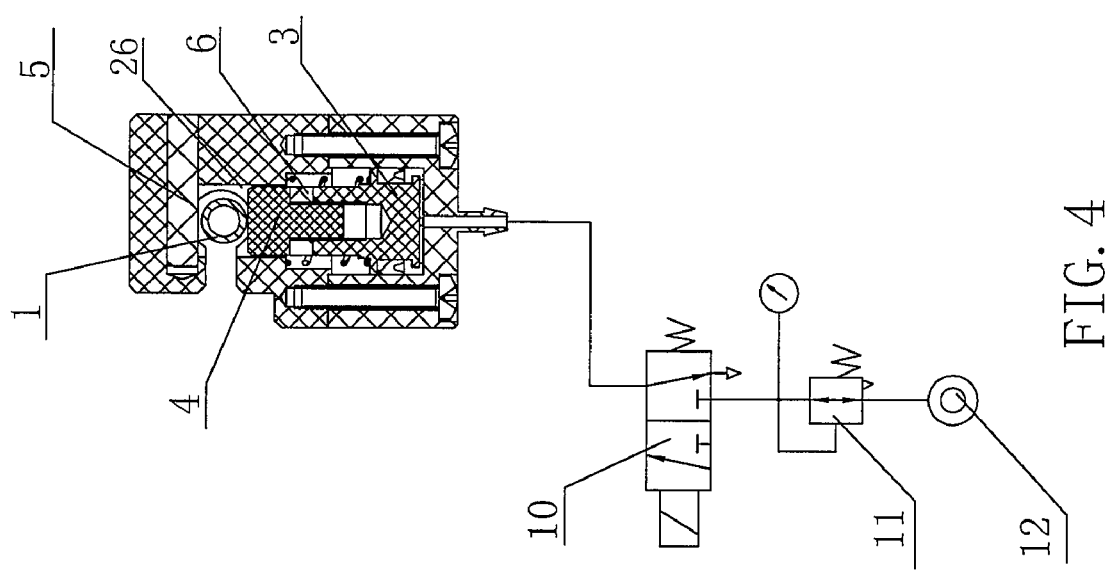

Hereinafter, the first embodiment of the present invention will be described with reference to FIGS. 3-5. The pneumatic pinch valve of the present invention uses a single acting cylinder as a power mechanism. In an operating state (i.e. an intercepting state) of the pneumatic pinch valve, an external pressure is applied to a fluid tube 1 so as to pinch an inner wall of the fluid tube 1 in a contacting-closed state, and thus the fluid in the fluid tube 1 is intercepted. The fluid tube 1 is made of a relatively soft and resilient material, so that the inner wall of the fluid tube 1 may be deformed into a fatten shape in a contacting-closed state and then the fluid tube 1 is closed when a preset external pressure is applied to the fluid tube 1, and the inner wall of the fluid tube 1 may be recovered to its initial shape when the preset external pressure is withdrawn.

The pneumatic pinch valve of the present invention includes a main body 2, a piston 3, a pressing piece 4 and a lever 5. An opening 23 and a cavity 26 communicated with the opening 23 are provided in the main body 2. The cavity 26 is divided into a first cavity 24 and a second cavity 25 by an engagement of the piston 3 with an inner wall of the cavity 26. The first cavity 24 is provided with an air inlet port 27. The pressing piece 4 is positioned inside the second cavity 25 and supported on the piston 3. The lever 5 is installed on the main body 2 and positioned on one side of the pressing piece 4. A fluid tube receiving space 28 is formed between the lever 5 and the pressing piece 4, and the capacity of the fluid tube receiving space 28 is changeable. The main body 2 includes a cylinder body 21 and a gate element 22 which is integrally secured to the cylinder body 21 by a threaded fastener 8. That is, the cavity 26 is formed between the cylinder body 21 and the gate element 22. The pneumatic pinch valve of the present invention further includes a resilient element 7, an adjusting gasket 6 and a seal ring 9. The resilient element 7, such as a spring, may be received in the second cavity 25, wherein one end of the resilient element abuts against the wall of the second cavity 25 and the other end thereof abuts against the piston 3. The adjusting gasket 6 is positioned between the piston 3 and the pressing piece 4. The seal ring 9 is positioned between the outer circumferential wall of the piston 3 and the inner wall of the cavity 26.

The cylinder body 21 is used to provide a space for converting energy of the air into a thrust force. The piston 3 which may slide in the cylinder body 21 is a converting element for converting the energy of the air into a thrust force. When the air is introduced into the first cavity 24, the piston 3 will overcome the counterforce of the spring 7 and the friction resulted from the movement of the pressing piece 4, and move the pressing piece 4 toward the fluid tube receiving space 28 so as to pinch the fluid tube 1 with the lever 5, and thus a distance between the pressing piece 4 and the lever 5 is gradually reduced until the inner wall of the fluid tube 1 is deformed into a flatten shape in a contacting-closed state. When the air of the first cavity 24 is discharged out and an air outlet port 27 is communicated with the atmosphere, the spring 7 will push the piston 3 far away from the fluid tube receiving space 28, and thus the distance between the pressing piece 4 and the lever 5 is gradually increased so that the fluid tube 1 will recover to its initial shape by itself elasticity. Preferably, the lever 5 has a cylindrical surface instead of a planar surface, so that a pressure of the pneumatic pinch valve for intercepting fluid in the fluid tube 1 is lower; at the same time, unlike the planar surface with edges and corners, no shear force will arise due to the smoothness of the cylindrical surface of the lever 5, which is beneficial to reduction of the fatigue deformation of the fluid tube 1. The air inlet port 27 of the pneumatic pinch valve is communicated with an air source. When an air is introduced through the air inlet port 27, the piston 3 is urged to move toward the fluid tube receiving space 28 by the pressure of the air. When the air is discharged out through the air outlet port 27, the piston 3 is urged to move far away from the fluid tube receiving space 28. The seal ring 9 is used to partition the first cavity 24 and the second cavity 25, so as to prevent the air from leaking and to make the air completely act on the piston 3. It should be noted that a prescribed circumferential gap should be kept among the piston 3, the pressing piece 4, and the gate element 22 so that the air in the second cavity 25 of the pneumatic pinch valve is communicated with the atmosphere, accordingly the air may be smoothly introduced into the second cavity 25 or discharged out from the second cavity 25, and no resistance force due to the friction between circumferential surfaces will be applied to the piston 3 during the movement of the piston 3.

The opening 23 is positioned at one side of the gate element 22. The size of the opening 23 is designed so that the fluid tube 1 can be just inserted into the opening 23 when the fluid tube 1 is pressed into a flatten form by hand. If the size of the opening 23 is too large, the fluid tube 1 would easily fall off during the operation of the valve. The fluid tube receiving space 28 which capacity is changeable is referred as "a gateway". When the pneumatic pinch valve is in the non-operation state (i.e. a releasing state), the fluid tube 1 in the gateway 28 can not be pressed and deformed, or else the resistance force applied to fluid flow will be increased. However, if a gap between the fluid tube 1 and the opening 23 is too large, the response speed of the pneumatic pinch valve is reduced. The gap between the fluid tube 1 and the opening 23 should be designed such that the fluid tube 1 just may be moved therein freely.

In order to assure that the opposite inner walls of the fluid tube 1 can be pinched in a contacting-closed state and released, and to prevent the earlier fatigue or breakage of the fluid tube 1 due to all the pressures applied to the fluid tube 1 all the way during the long-time operation, the fluid tube 1 is pinched with constant pressurized amount. That is, when the fluid tube 1 is pressed into a prescribed pressurized amount, the position of the pressing piece 4 will be limited so that the fluid tube 1 will not be continuously pressed. In this way, no matter what kind of the fluid tube is used, the valve would produce satisfying effects as long as an optimal pressurized amount of the tube is determined in advance. The optimal pressurized amounts are different for various fluid tubes which respectively have different materials and the thickness of the wall. For the fluid tube to be used, an optimal pressurized amount will be selected by different experiments on the durability of the fluid tube under the various pressurized amounts, so as to assure that the fluid in the fluid tube 1 may not leak under the maximum pressure and the durability of the fluid tube is maximum if this optimal pressurized amount is used. According to this optimal pressurized amount, the adjusting gasket 6, which may have different thickness, can be used to control the minimum distance between the pressing piece 4 and the lever 5, i.e. the minimum value of the valve port, so that the fluid tube 1 can operate in the optimal pressing amount. If the fluid tube is required to use for a long time and the value of the optimal pressing amount for the fluid tube is also determined, the adjusting gasket 6 may be integrally formed with the piston 3, so as to simplify the manufacturing and assembly process of these components.

The operation process of the pneumatic pinch valve of the present invention will be described as follows with reference to FIGS. 4 and 5.

The fluid tube 1 is inserted into the fluid tube receiving space 28 between the lever 5 and the pressing piece 4 via the opening 23. When the pressing piece 4 is in a releasing state, the lever 5 and the pressing piece 4 do not apply a pressure to the fluid tube 1 and thus the fluid tube 1 is in a free state so that the fluid can smoothly flow through the fluid tube 1. When the pressing piece 4 is moved upward by the piston 3, the pressing piece 4 and the lever 5 apply a pressure to the fluid tube 1, so that the fluid tube 1 is deformed until the inner wall of the fluid tube 1 changes into a flatten shape in a contacting-closed state, and thus the fluid in the fluid tube 1 is intercepted. When the pressing piece 4 releases again, the fluid tube 1 will recover to the free state due to itself elasticity, and thus the fluid may smoothly flow through the fluid tube 1. In this way, such control can selectively intercept the fluid in the fluid tube 1 or allow the fluid to pass through the fluid tube 1.

As the precondition for the operation of the pneumatic pinch valve of the present invention, an air source 12 is needed, and a three-way valve (may be dielectrically controlled, monoelectrically controlled, mechanically controlled or manually controlled) is further required, so as to control the air to flow into or out from the three-way valve. As shown in FIGS. 4 and 5, when the pressing piece 4 is in the releasing state, the air is blocked by the three-way valve 10, and meanwhile, the first cavity 24 of the pneumatic pinch valve is communicated with the atmosphere via the air inlet port 27 and the three-way valve 10; under the elastic force of the spring 7, the piston 3 is positioned at the bottom end of the cylinder body 21, and the fluid tube 1 is released in the free state, thus the intercepted fluid is released to flow through the fluid tube 1 smoothly. When the pressing piece 4 is in the pinching state, the air is introduced into the first cavity 24 of the pneumatic pinch valve via the three-way valve 10. Under the action of the air, the piston 3 is moved toward the fluid tube receiving space 28, and the pressing piece 4 is driven to move so that the distance between the pressing piece 4 and the lever 5 gradually become narrower, and finally, the inner wall of the fluid tube 1 is pressed into a flatten shape in a contacting-closed state, consequently, the fluid in the fluid tube 1 is intercepted.

In order to adjust the pinching force of the pneumatic pinch valve applied on the fluid tube, various air sources with different pressures can be selected, a pressure-regulating valve is adjusted, or the cylinder body and the piston having different diameters can be selected based on computation and in terms of counterforce of the spring at the same time. For the fluid tube to be used, the reasonable pressure value can be selected by durability test of the fluid tube. In this way, the fluid tube may have relatively long durability even if the fluid tube will be pinched in a constant pressure mode.

Figure 7:
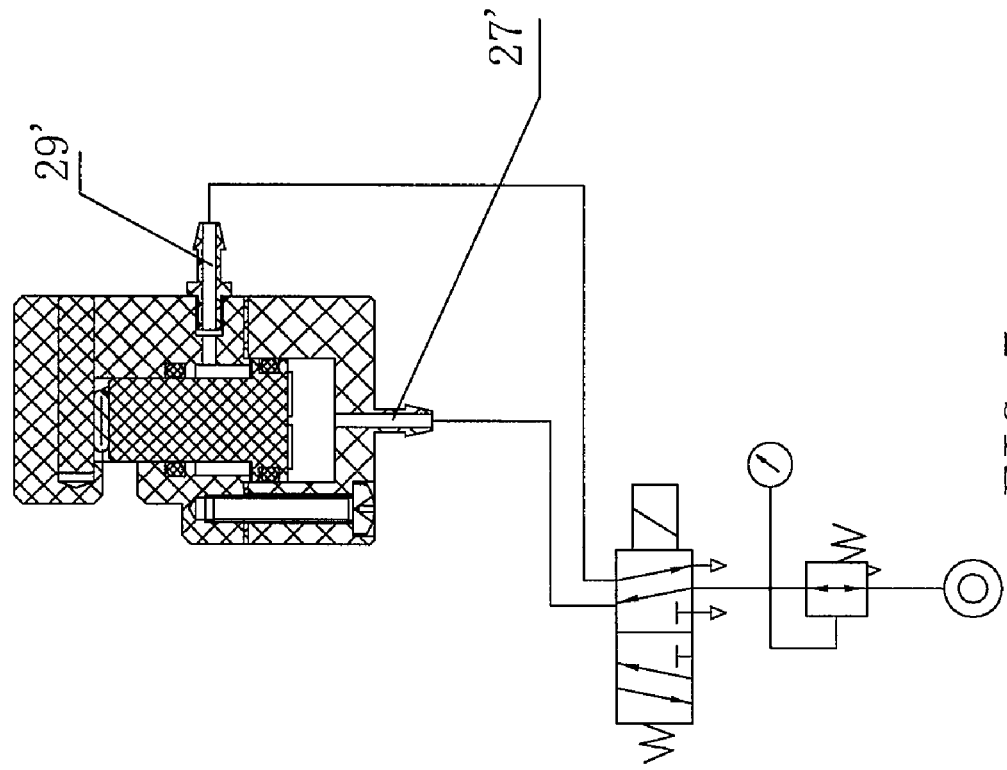
FIGS. 6 and 7 illustrate operation process of the pneumatic pinch valve respectively in the releasing state and the intercepting state according to a second embodiment of the present invention.
Figure 6:
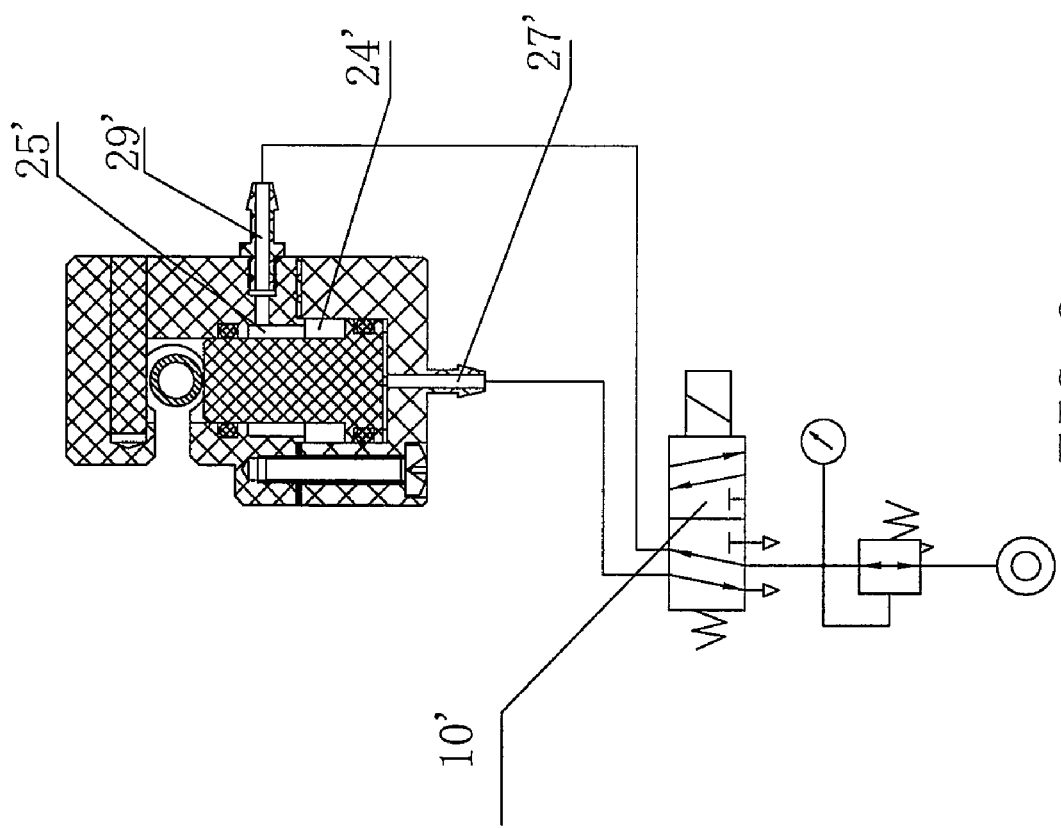

Now the second embodiment of the present invention will be described with reference to the FIGS. 6 and 7. The main differences between the second embodiment and the first embodiment lie in: the resilient element 7 is omitted and another air inlet port 29' is provided at the second cavity 25'; the air inlet ports 27' and 29' are communicated with a five-way valve 10' at the same time, and thus the pinching state and the releasing state of the fluid tube 1 can be achieved by controlling the pressures of the first cavity 24' and the second cavity 25' of the cylinder body 21 through the five-way valve 10'. That is to say, during pinching the fluid tube 1 by the pressing piece 4 and the lever 5, since the air source is communicated with the first cavity 24' sequentially via the five-way valve 10' and the air inlet port 27', and the air inlet port 29' of the second valve 25' is closed by the five-way 10', the piston 3 will be urged to move toward the fluid tube receiving space 28 by the air introduced into the first cavity 24', and thus the fluid in the fluid tube 1 is intercepted. During releasing the fluid tube 1 by the pressing piece 4 and the lever 5, since the air inlet port 27' of the first cavity 24' is closed by the five-way valve 10', and the air source is communicated with the second cavity 25' sequentially via the five-way valve 10' and the air inlet port 29', the piston 3 will be urged to move far away from the fluid tube receive space 28 by the air introduced into the second cavity 25' and the atmosphere at the opening 23, and thus the intercepted fluid is released to flow through the fluid tube 1.

It should be noted that the present invention may be implemented without limitation of the above embodiments. On a basis of the construction of the second embodiment, a resilient element 7 may be further provided around the piston, and thus the piston may be urged by this resilient element 7, the second cavity 25' and the air inlet port 29' of the second cavity 25' together.

In the present invention, the power may be provided to pinch the fluid tube in a pneumatic-driving mode with simple construction, and different magnitude of pinching forces may be obtained by selecting different pressure of the air source or adjusting pressure regulating valve. For different fluid tubes, the optimal or adjustable pressing amount can be set. Each fluid tube may have desired durability for the case that the fluid tube is pinched with constant pressurized amount, variation of the pinching force resulted from the fluctuation of air pressure is prevented, and unreliability of the pinching effect and the invalidation of fluid tube can be avoided. It will be convenient to install and detach the fluid tube owing to the opening of one side surface of valve port. When the pneumatic pinch valve will be repaired and replaced, it is not necessary to break off the tubes so as to prevent the fluid from leaking out of the tubes.

What is claimed is:

1. A pneumatic pinch valve, comprising:
   a lever and a pressing piece, a fluid tube receiving space being formed between the lever and the pressing piece;
   a main body defining a cavity therein that comprises an opening whose size accommodates a plurality of outside diameters of fluid tubes and is used for installation of and pinching actions on each of the fluid tubes;
   a piston located in the cavity of the main body, in which the cavity comprises a first cavity, which is pressurized when a fluid tube is pinched, and a second cavity, and the pressing piece being positioned in the second cavity and supported on the piston;
   at least one pinching action control feature that is located within the second cavity between the piston and the pressing piece and is used to protect the fluid tubes by limiting one or more amounts of compression of the fluid tubes from the pinching actions on the fluid tubes, wherein
   the piston is to support and to move both the at least one pinching action control feature and the pressing piece during the pinching actions; and
   a pneumatic discharge port configured for both discharging a gas from and supplying the gas to the pneumatic pinch valve for the pinching actions rather than comprising a first pneumatic port for inlet and a separate pneumatic port for outlet of the gas for the pinching actions.

2. The pneumatic pinch valve according to claim 1, wherein the main body comprises:
   a cylinder body in which the cavity is provided and a gate element integrally secured to the cylinder body, wherein
   the opening that communicates with the fluid tube receiving space is provided at a side of the gate element for installing one of the fluid tubes with any one of the plurality of outside diameters, and
   the lever is provided at the gate element.

3. The pneumatic pinch valve according to claim 2, wherein an air discharge mechanism comprises the resilient element which is received in the second cavity of the main body and arranged around an outer wall of the piston, and two ends of the resilient element abut against an end of the second cavity and an end of the piston respectively.

4. The pneumatic pinch valve according to claim 2, wherein the air discharge mechanism is an air intaking mechanism which is communicated with the second cavity, and air introduced into the second cavity via the air intaking mechanism pushes the piston so as to discharge the air in the first cavity.

5. The pneumatic pinch valve according to claim 1, further comprising an air discharge mechanism that comprises a resilient element which is received in the second cavity of the main body and arranged around an outer wall of the piston, and two ends of the resilient element abut against an end of the second cavity and an end of the piston respectively.

6. The pneumatic pinch valve according to claim 5, wherein the at least one pinching action control feature comprises an adjusting gasket and is provided between the piston and the pressing piece to adjust a size of the fluid tube receiving space between the pressing piece and the lever to accommodate the plurality of outside diameters of the fluid tubes in an uncompressed state.

7. The pneumatic pinch valve according to claim 1, wherein the air discharge mechanism is an air intaking mechanism which is communicated with the second cavity, and air introduced into the second cavity via the air intaking mechanism pushes the piston so as to discharge the air in the first cavity.

8. The pneumatic pinch valve according to claim 7, wherein an adjusting gasket is provided between the piston and the pressing piece so as to adjust a size of the receiving space for the fluid tube between the pressing piece and the lever.

9. The pneumatic pinch valve according to claim 1, wherein the at least one pinching action control feature comprises an adjusting gasket and is provided between the piston and the pressing piece to adjust a size of the fluid tube receiving space between the pressing piece and the lever to accommodate the plurality of outside diameters of the fluid tubes in an uncompressed state.

10. The pneumatic pinch valve according to claim 1, wherein the lever is in a shape of cylinder.

11. The pneumatic pinch valve according to claim 1, wherein a sealing ring is provided between an outer wall of the piston and the inner wall of the cavity.

12. The pneumatic pinch valve according to claim 1, in which the air introduced into the first cavity is discharged through the air inlet port.

13. The pneumatic pinch valve of claim 1, wherein the lever comprises a cylindrical surface upon which the fluid tube is pressed to block and allow the flow of the fluid.

14. The pneumatic pinch valve of claim 1, in which the size of the opening defines a width of the fixed opening.

15. The pneumatic pinch valve of claim 1, in which at least one of the fluid tubes comprises an outsider diameter that is larger than the size of the opening.

16. The pneumatic pinch valve of claim 1, in which the lever being fixedly installed on the main body to remain stationary during pinching actions of the pneumatic pinch valve.

17. The pneumatic pinch valve of claim 1, in which the each of the fluid tubes is installed into the main body through the opening in a direction that is perpendicular to a direction along a length of the each of the fluid tubes.

18. The pneumatic pinch valve of claim 1, in which the at least one pinching action control feature is configured to cause the pressing piece to move a predetermined amount for the pinching actions regardless of types, materials, or geometric configurations of the fluid tubes.

* * * * *